United States Patent
Bills et al.

(10) Patent No.: US 11,181,918 B2
(45) Date of Patent: Nov. 23, 2021

(54) MOVING TRAFFIC OBSTACLE DETECTION AND AVOIDANCE

(71) Applicant: International Business Machines Corporation, Armonk, NY (US)

(72) Inventors: Tierra Bills, Nairobi (KE); Reginald Bryant, Nairobi (KE); Xiangzhu Long, Nairobi (KE); Aisha Walcott, Nairobi (KE); John Wamburu, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 15/859,491

(22) Filed: Dec. 30, 2017

(65) Prior Publication Data

US 2019/0004525 A1  Jan. 3, 2019

Related U.S. Application Data

(63) Continuation of application No. 15/640,489, filed on Jul. 1, 2017, now abandoned.

(51) Int. Cl.
  *G05D 1/02* (2020.01)
  *G08G 1/16* (2006.01)
  *G01C 21/34* (2006.01)

(52) U.S. Cl.
  CPC .......... *G05D 1/0214* (2013.01); *G01C 21/34* (2013.01); *G05D 1/0223* (2013.01);
  (Continued)

(58) Field of Classification Search
  CPC .......... G06T 7/593; G06T 2207/10012; G06T 2207/30252; G06T 2207/30261; G06T 2207/10021; G06T 2207/10048; G06T 2207/30248; G06T 7/20; G06T 7/285; G06T 7/50; G06T 15/00;
  (Continued)

(56) References Cited

U.S. PATENT DOCUMENTS

| | | | | |
|---|---|---|---|---|
| 5,504,482 A | * | 4/1996 | Schreder | G01C 21/26 340/995.13 |
| 6,427,114 B1 | * | 7/2002 | Olsson | H04L 47/10 340/934 |

(Continued)

FOREIGN PATENT DOCUMENTS

| | | | | |
|---|---|---|---|---|
| CN | 11022132 A | * | 7/2019 | G01S 19/45 |

OTHER PUBLICATIONS

Tierra Bills et al., unpublished U.S. Appl. No. 15/640,489, filed Jul. 1, 2017, Moving Traffic Obstacle Detection and Avoidance, pp. 1-37 plus 8 sheets of drawings.

(Continued)

*Primary Examiner* — Tuan C To
*Assistant Examiner* — Paul A Castro
(74) *Attorney, Agent, or Firm* — Shimon Benjamin; Otterstedt, Wallace & Kammer, LLP

(57) ABSTRACT

The disclosure provides systems and methods for detecting and managing moving traffic obstacles. In embodiments, a database of historical and potential moving traffic obstacles is generated from vehicle sensor data. The database includes vehicle manoeuvre data and characterizations thereof. The database is used to map moving traffic obstacle locations such that driving aids and autonomous vehicles can account for such obstacles.

18 Claims, 8 Drawing Sheets

(52) U.S. Cl.
CPC ........... *G05D 1/0278* (2013.01); *G08G 1/165* (2013.01); *G08G 1/166* (2013.01)

(58) Field of Classification Search
CPC . G06T 2207/10028; G06T 5/50; G06T 7/246; G06T 7/70; G06T 7/74; G06T 7/596; G06T 7/73; G06T 2200/04; G06T 2207/10032; G06T 2207/30256; G06T 2215/12; G06T 7/215; G06T 7/55; G06T 7/60; G06T 2207/30232; G06T 7/248; H04W 4/40; H04W 4/024; H04W 4/027; H04W 4/42; H04W 4/48; G05D 1/0088; G05D 2201/0213; G08G 1/096827; G08G 1/096838; G08G 1/096816; G08G 1/0112; G08G 1/012; G08G 1/0141; G08G 1/093; G08G 1/096844; G08G 1/16; G08G 7/02; G08G 5/0069; G01C 21/3415; G01C 21/3461; G01C 21/3407; G01C 21/26; G01C 21/34; G01C 21/3492; G01C 21/3667; G01C 21/3655
See application file for complete search history.

(56) References Cited

U.S. PATENT DOCUMENTS

| | | | |
|---|---|---|---|
| 10,037,689 B2* | 7/2018 | Taylor | G06K 7/10475 |
| 10,176,389 B2 | 1/2019 | Tatsubori | |
| 2004/0068364 A1 | 4/2004 | Zhao et al. | |
| 2010/0076685 A1 | 3/2010 | Eidehall | |
| 2011/0178702 A1 | 7/2011 | Lassesson et al. | |
| 2014/0278052 A1* | 9/2014 | Slavin | G08G 1/0129 701/400 |
| 2017/0138751 A1* | 5/2017 | Martyniv | G06Q 10/02 |
| 2017/0243485 A1* | 8/2017 | Rubin | H04W 72/005 |

OTHER PUBLICATIONS

Paul J. Otterstedt, List of IBM Patents or Patent Applications Treated as Related, Jun. 22, 2018, pp. 1-2.
Tatsubori, Michiaki & Walcott, Aisha & Wamburu, John & Bills, Tierra & Bryant, Reginald & Long, Xiangzhu. (2016). Moving Traffic Obstacle Detection from Smartphone-based Probe Cars Jul. 19, 2016 pp. 1-4 plus cover.

* cited by examiner

| | | 1 | 2 | 3 | 4 | 5 | 6 | 7 | 8 | 9 |
|---|---|---|---|---|---|---|---|---|---|---|
| | 7 | 6 | 6 | 6 | 6 | 6 | 6 | 6 | 6 | 6 |
| | 6 | 2 | 4 | 2 | 2 | 6 | 6 | 6 | 5 | 6 |
| Position on Road | 5 | 6 | 5 | 6 | 6 | 6 | 6 | 6 | 6 | 6 |
| | 4 | 1 | 4 | 5 | 4 | 4 | 4 | 1 | 1 | 1 |
| | 3 | 6 | 6 | 6 | 5 | 6 | 6 | 6 | 6 | 6 |
| | 2 | 1 | 1 | 1 | 1 | 2 | 5 | 1 | 1 | 1 |
| | 1 | 6 | 6 | 6 | 6 | 6 | 2 | 6 | 6 | 6 |

Vehicle

*FIG. 4*

MOVING TRAFFIC OBSTACLE DETECTION AND AVOIDANCE

CROSS-REFERENCE TO RELATED APPLICATIONS

This application is a continuation of U.S. patent application Ser. No. 15/640,489 filed Jul. 1, 2017, the complete disclosure of which is expressly incorporated herein by reference in its entirety for all purposes.

BACKGROUND

In embodiments, the technical field of the invention is methods and systems for detecting and managing moving traffic obstacles.

In cities in developing countries like Nairobi, Kenya, it is common for roadways to be shared by a variety of transport modes. These modes include personal vehicles, trucks, two-wheelers, animals, bicycles, pushcarts, and pedestrians. Such road sharing creates situations where unexpected slow moving traffic obstacles cause faster moving vehicles to maneuver in order to overtake or avoid the obstacles. Currently available systems include detection of road irregularities and emergency traffic hazards with smartphone sensors, but the irregularities and hazards that can be detected are fixed rather than moving. The lack of any reliable system for detecting moving obstacles means that automated driving systems have more difficulty anticipating route corrections, and furthermore means that driving aids such as route suggestion software is less accurate than it would be with data about moving obstacles.

Detecting and characterizing moving obstacles is challenging due to the nature of a moving obstacle. Traditional methods for detecting road hazards either fail to recognize the temporal aspect of a moving obstacle or fail to identify that a moving obstacle exists. Ideal systems that aid route suggestion software and/or autonomous (or semi-autonomous) vehicles would identify, characterize, and/or account for moving obstacles.

SUMMARY

In an aspect, then, is a method for controlling a route of an object, the method comprising: receiving a starting location and a destination location from a device onboard the object; determining a first potential route between the starting and destination locations; identifying all moving traffic obstacles along the first potential route from a moving traffic obstacle database, the moving traffic obstacle database comprising an interconnected array of paths; determining a second potential route between the starting and destination locations; identifying all moving traffic obstacles along the second potential route from the moving traffic obstacle database; identifying a preferred route from the first and second routes, the preferred route having a minimum of moving traffic obstacles; communicating instructions to the device to follow the preferred route, wherein the object subsequently follows the preferred route. In embodiments:

the moving traffic obstacle database comprises an interconnected array of paths, and the method further comprises: collecting test sensor data for a plurality of test objects traversing a first path; determining, from the test sensor data, the presence of a moving traffic obstacle at a hazard location along the path, and determining a characteristic of the moving traffic obstacle; adding the hazard location to the moving traffic obstacle database;

the characteristic of the moving traffic obstacle is whether the moving traffic obstacle is stationary or mobile;

the object is an autonomous or semi-autonomous vehicle, and wherein the instructions comprise machine readable instructions configured to cause the object to automatically follow the preferred route;

the object is a vehicle and wherein the device comprises a display, and wherein the instructions cause the preferred route to be displayed on the display;

the minimum of moving traffic obstacles is the minimum number of moving traffic obstacles or the minimum severity of moving traffic obstacles, or a combination thereof;

the first and second potential routes each comprise a plurality of connecting paths, and wherein at least one path from the first potential route differs from at least one path from the second potential route; and the moving traffic obstacle database comprises an interconnected array of paths, and wherein the method further comprises: collecting test sensor data for a plurality of test objects serially traversing a test path, wherein the test path is selected from the array of paths, and wherein the test sensor data further comprises time stamp metadata; identifying in the test sensor data maneuver actions and their associated time stamps at predefined locations along the test path; grouping the identified maneuver actions from the test sensor data according to their time and locations; identifying moving traffic obstacles from the grouped maneuver action data.

In an aspect is a method for controlling a maneuver by an object, the method comprising: determining a location of the object and correlating the location of the object to a path in a moving traffic obstacle database, the moving traffic obstacle database comprising an array of interconnected paths and one or more moving traffic obstacles, each moving traffic obstacle having an associated moving traffic obstacle locations along the interconnected paths; determining, from the moving traffic obstacle database, a relevant moving traffic obstacle at a relevant moving traffic obstacle location in close proximity to the location of the object; determining maneuver instructions based on: the relevant moving traffic obstacle; the relevant moving traffic obstacle location; the object; and the object location; communicating the maneuver instructions to a device associated with the object, wherein the communicating causes the device to automatically execute or display the maneuver instructions. In embodiments:

the moving traffic obstacle location is correlated to the path of the object or to a path adjacent to the path of the object;

the device is a standalone GPS system with a display, and wherein the maneuver instructions are configured to automatically appear on the display;

the device is a control module for an autonomous or semi-autonomous vehicle, and wherein the maneuver instructions are configured to control to movement of the vehicle;

the maneuver instructions comprise a steering component and a speed component, and wherein the maneuver instructions instruct a driver or a control module to avoid the moving traffic obstacle location;

the moving traffic obstacles in the moving traffic obstacle database are selected from moving vehicles, stationary vehicles, animals, pedestrians, non-motorized vehicles, and unspecified obstacles, and wherein the moving traffic obstacle locations in the moving traffic obstacle database are based on test sensor data obtained from test objects traversing the interconnected paths;

the method further comprises: collecting test sensor data for a plurality of test objects serially traversing a test path, wherein the test path is selected from the array of paths, and wherein the test sensor data further comprises time stamp metadata; identifying in the test sensor data maneuver actions and their associated time stamps at predefined locations along the test path; grouping the identified maneuver actions from the test sensor data according to their time and locations; and identifying the moving traffic obstacles from the grouped maneuver action data;

the grouping of identified maneuver actions is based on time and location metadata pertaining to the test sensor data;

the array of interconnected paths are roadways and wherein the method further comprises communicating the moving traffic obstacle locations to a roadway maintenance system; and the method further comprises determining a velocity of the object and predicting a future location of the object based on the velocity and location of the object, and when the future location of the object is in proximity to a moving traffic obstacle location, calculating an alternative route that avoids the future location and communicating to the device an alert comprising the moving traffic obstacle location and the alternative route.

In an aspect is a system comprising: a processor; a memory coupled to the processor, the memory configured to store program instructions for instructing the processor to carry out the methods as above.

These and other aspects of the invention will be apparent to one of skill in the art from the description provided herein, including the examples and claims.

BRIEF DESCRIPTION OF THE DRAWINGS

FIG. 4 provides a chart showing sample data for several vehicles over a section of road according to an embodiment of the invention.

DETAILED DESCRIPTION

Figure 1:
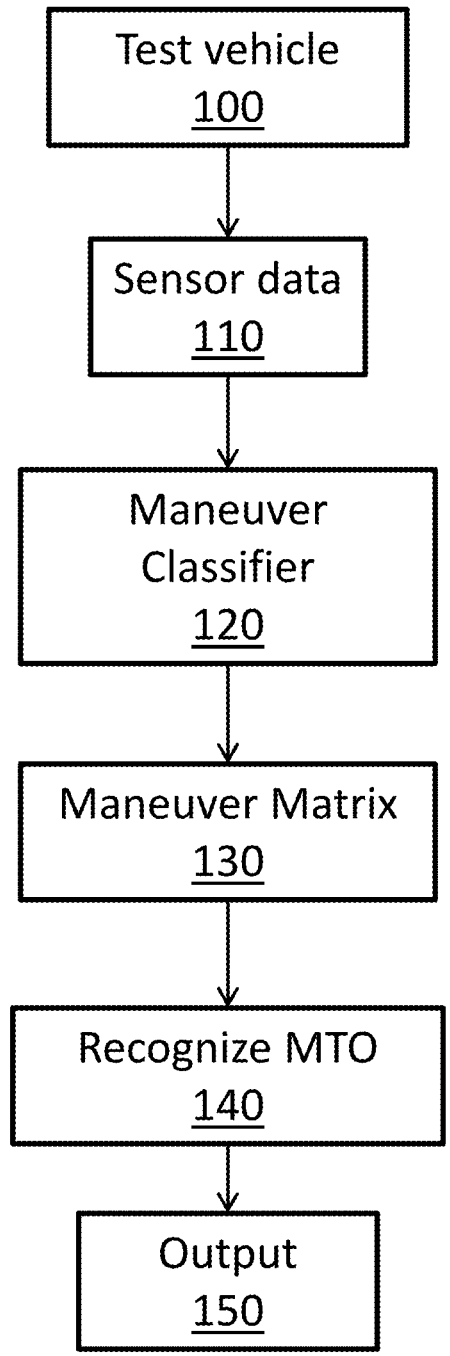
FIG. 1 provides a flow diagram showing the acquisition, processing, and output of data according to an embodiment of the invention.

In an aspect is a method for controlling a route of an object, the method comprising: receiving a starting location and a destination location from a device on-board the object; determining a first potential route between the starting and destination locations; identifying all moving traffic obstacles along the first potential route from a moving traffic obstacle database, the moving traffic obstacle database comprising an interconnected array of paths; determining a second potential route between the starting and destination locations; identifying all moving traffic obstacles along the second potential route from the moving traffic obstacle database; identifying a preferred route from the first and second routes, the preferred route having a minimum of moving traffic obstacles; communicating instructions to the device to follow the preferred route, wherein the object subsequently follows the preferred route.

In another aspect is a method for controlling a maneuver by an object, the method comprising: determining a location of the object and correlating the location of the object to a path in a moving traffic obstacle database, the moving traffic obstacle database comprising an array of interconnected paths and one or more moving traffic obstacles, each moving traffic obstacle having an associated moving traffic obstacle locations along the interconnected paths; determining, from the moving traffic obstacle database, a relevant moving traffic obstacle at a relevant moving traffic obstacle location in close proximity to the location of the object; determining maneuver instructions based on: the relevant moving traffic obstacle; the relevant moving traffic obstacle location; the object; and the object location; communicating the maneuver instructions to a device associated with the object, wherein the communicating causes the device to automatically execute or display the maneuver instructions.

In embodiments, the methods described herein are carried out by a system. The system comprises a processor and memory coupled to the processor, the memory configured to store program instructions for instructing the processor to carry out the steps of the method. Other components of the system may be present as necessary to carry out the intended steps and functions. In specific embodiments, the system comprises a server and a user device, wherein the user device is configured to be located on-board the object and the server is remote from the object. The server and user device communicate via a network as described herein. In some such embodiments the user device is an input/output (I/O) device, obtaining input such as locations and providing output such as preferred routes, but the user device does not carry out route calculations, characterizations of maneuvers, etc. In these embodiments the server functions as a back-end support to carry out route calculations, map storage, characterizations of maneuvers, etc., which are then communicated to the user device. In other such embodiments the user device functions as a fully integrated device including I/O functions as well as calculating routes, characterizing maneuvers, etc. based on locally stored data. In these embodiments the server is typically present as a supporting device, providing storage and updates of maps and algorithms based on aggregated data from many users.

The object is a mobile object. In embodiments, the object is a motorized vehicle, such as an automobile, van, truck, motorcycle, scooter, or the like. In embodiments the object may be a non-motorized object, such as a bicycle or shopping cart. In embodiments, the object is a vehicle such as an automobile. In embodiments, the object is one that traverses a route, wherein a "route" is a sequence of connected paths (also referred to as road segments). Throughout this disclosure, and for the sake of convenience, the specific example of a vehicle (and, impliedly, a motorized vehicle) will be used as a representative example of an object. Such use is not intended to be limiting in any way, however, and unless otherwise specified any reference to a vehicle is intended to include non-vehicle objects (e.g., non-motorized objects).

The method involves receiving a starting location and a destination location from a device on-board the object. These locations are typically provided as GPS coordinates, landmarks, street intersections, addresses, or some other specification of geo-location. The starting location may be where the device is physically located, or may be another location such as a location where the device is expected to be at a future time. In embodiments, the starting location can be automatically generated (and the device is configured to automatically generate the starting location) based on sensor data (i.e., GPS coordinates of the device).

The on-board device is also referred to herein as a user device. The user device may be a mobile device (e.g., a smartphone, tablet, or other mobile device that is able to be removed and used apart from the object) or a fixed device such as a route recommendation system (e.g., a GPS device) or autonomous controls system fixed in a vehicle. The user device provides a convenient interface for the user to input starting and/or destination locations. The user interface may include a display (including a touch screen) and/or an audio system configured to communicate audio messages to the user. In embodiments, the user device is a stand-alone device that comprises a GPS sensor and a user interface.

The method involves determining a first potential route between the starting and destination locations, and determining a second potential route between the starting and destination locations. The method may further involve determining additional potential routes as necessary or desired. Each potential route is a sequence of connected paths (e.g., road segments) such that the object, by following the sequence, will arrive at the destination location having started at the starting location. A path (e.g., road segment) can be of any suitable length. In some embodiments a path extends between two intersections (i.e., locations where two paths intersect), while in other embodiments a path may include or pass through a plurality of intersections. Each path may be given a unique path ID (which may also be referred to as a road segment ID) such that a route may comprise a sequence of path IDs. A route may be assigned a unique route ID, e.g., for ease of reference to the route. Alternatively a route may be referred to simply by the sequence of path IDs in the route. Different potential routes (e.g., a first and a second potential route) may contain certain identical paths but will differ in at least one path and yet will start and end at the same locations. While multiple potential routes (e.g., 2, 3, 4, 5, or more than 5) are identified for any specific request, only one potential route will be identified by the system and method herein as the recommended route in response to the request. A "potential" route is one that is identified, e.g., by the system, that can be subjected to further analysis to determine the suitability of the route prior to converting the potential route to a recommended route. Such analysis includes factors such as the route distance, the route complexity, use of specific types of roadways on a route (e.g., percentage of time or distance using freeway segments as opposed to side streets or unpaved segments, etc.), and MTOs along the route as described herein. Any of these factors in any combination can be used to rank the potential routes in order for the system/method to select a recommended route. Furthermore, the potential routes can be re-analzyed after any updates to these factors are received and/or as an object traverses along a recommended route. For example, as an object traverses a recommended route, the system can continuously update the GPS location (or other measure of location) of the object and continuously recalculate the potential routes available to the object. If a new recommended route is identified during the process, it can be communicated to the object as described herein.

As mentioned, the methods involve identifying moving traffic obstacles along a potential route (first, second, etc. potential routes). Moving traffic obstacles are identified from a moving traffic obstacle database and correspond to those with geo-locations along the potential route (e.g., a geo-location that corresponds to the coordinates covered by a road segment within a potential route). The method may involve identifying all moving traffic obstacles from the moving traffic obstacle database that are along the potential route, or a subset of such moving traffic obstacles (e.g., those with a predetermined severity, scope, frequency, or the like).

The moving traffic obstacle database (MTO database) comprises records of MTOs at various locations. In embodiments, the MTO database comprises data providing an interconnected array of paths and further data providing MTOs at various locations along those paths. In embodiments the MTO database comprises a list of MTOs, which list includes, for each MTO in the list, an identifying characteristic of the MTO and the location of the MTO, as well as optionally other information about the MTO. The location of the MTO may, e.g., be in the form of GPS coordinates or other geo-location information as described herein. Due to the nature of MTOs, the location of the MTO may be a plurality of locations or a range of locations (e.g., locations between first and second GPS coordinates). The identifying characteristic may, e.g., be selected from the following: whether the moving traffic obstacle is stationary or mobile; or the nature of the object causing the moving traffic obstacle (e.g., whether animal, human, or inanimate object). Other optional information about each MTO includes any of the following: the day(s) and/or time(s) at which the MTO has been observed and/or is likely to be observed (e.g., if an MTO is more frequently observed on a weekend rather than a weekday, or if an MTO is more frequently observed in the morning); typical or frequent maneuvers used by vehicles encountering the MTO; updated information from maintenance or other authorities on the status of the MTO and whether it has been abated; more specific location information, such as a lane assignment on a multi-lane rode, or whether the MTO is present on only one side of the road (and therefore relevant for only one direction of traffic); other information as needed or desired. The MTOs and their identifying data are obtained using the methods described herein or the equivalent.

In embodiments, the array of interconnected paths are roadways that correspond to the roadways of a database of roadways (e.g., a roadway map such as Google Maps). A variety of commercial and open-source roadway databases are available, although in some embodiments the array of interconnected paths can be constructed from location data of test vehicles as described herein. It will be appreciated that certain details such as exact coordinates and roadway capacities and names may differ from one database to another, but that such differences tend to be minor and are not likely to severely reduce the functionality and feasibility of the methods disclosed herein.

A moving traffic obstacle in the MTO database may be characterized in a variety of ways. For example, a MTO may be characterized by the type of obstacle, such as moving vehicles, stationary vehicles, animals, pedestrians, non-motorized vehicles, and unspecified obstacles. Further information on this aspect is provided herein.

The MTO database may be stored locally on a user device, or may be stored on a server, or a combination thereof.

Where the MTO database is stored locally, the locally stored database is typically a copy of an MTO database on a server. Such copy can be automatically updated at regular intervals, any time that the user device is connected to a network, or upon initiation of an update by a user input. The updates of the local database may include MTOs identified due to a plurality of users transmitting maneuver information to the server. Where the MTO database is stored only on the server, the user device accesses the server in order to receive determined preferred routes. The server carries out all calculations and comparisons of routes since all MTO data is on the server. For example the user device may transmit the starting and destination locations to the server, and the server determines a plurality of routes as well as the MTOs along such routes in order to determine (and transmit back to the user device) a preferred route. Alternatively, the user device may transmit potential routes to the server, and the server determines a preferred route from such potential routes based on the store MTOs and other data. Alternatively, the server may receive potential routes from the user device and analyse such routes only for the MTOs along the routes. The server then returns to the user device an MTO score for each potential route, and the user device selects a preferred route based in part on other locally stored information.

As mentioned, the system/methods involve selecting a preferred route from the first and second (and any additional) routes. The selection is based, in part, on the MTOs that are identified along each potential route. Other factors include any of the following in any combination: traffic (either based on historical traffic patterns or based on current traffic data, or a combination thereof, and optionally figuring in traffic time/loss due to the presence of MTOs); weather (either based on historical weather patterns or current weather reports); incident reports (e.g., police or other reports of traffic accidents or other emergency activities); road quality (e.g., dirt roads v. highways); characteristics of the specific object with which the user device is associated (e.g., a vehicle with four-wheel drive capacity v. a saloon car); and other factors as desired. Each factor in the calculation, including the MTOs along a potential route, can be assigned a weighting, and the weighted factors can be summed or otherwise combined to determine a score for each potential route. With such objective scoring algorithm, the potential routes are compared and a preferred route is determined. In embodiments, weighting factors can be predetermined. In other embodiments, weighting factors determined from user input, such as allowing the user to decide that MTOs are more important than other factors, or that certain types of MTOs are more important than other types, etc. In embodiments, a preferred route may be determined, in part, by determining the number of MTOs along each potential route. In such embodiments the type and severity of MTOs may or may not be considered as factors in determining a preferred route.

When a preferred route is selected, in embodiments, the preferred route is communicated to the user device. In embodiments such communication is between the server and the user device and is via a network (i.e., the same network used by the user device to communicate starting and destination locations and/or route information to the server, such as a cellular, 3G, 4G, or WiFi network, or the like). The format of the communicated preferred route will depend on the user device as well as the intended user of the information. For example, in embodiments the preferred route is communicated as machine-readable instructions suitable for instructing an autonomous vehicle control system to direct an autonomous vehicle along the preferred route. As described herein in more detail, in embodiments the preferred route is communicated as machine-readable instruction suitable for altering the user interface of the user device, such as altering the display of the user device in order to display route instructions (e.g., turning instructions, distances to travel along road segments, etc.) and/or images (e.g., maps with the preferred route highlighted) to the user. In embodiments, based on the communication of the preferred route, the object follows the preferred route (or at least a portion thereof) and arrives at the destination location. More information on system output is provided herein elsewhere.

The MTO database is prepared from test sensor data and optionally continuously refined from data collected by user devices and/or test sensor data. The device is, for example, a user device as described herein, but may also be a dedicated test sensor device (references herein to test sensor data include data collected by either type of device). As mentioned, the collecting device can be a smartphone or other user device suitable for containing such sensors, which device will contain suitable software for the data collection.

In embodiments the test sensor data includes accelerometer, gyroscope, gravity, orientation, linear acceleration and magnetic field data from appropriate sensors (e.g., Accelerometer, Gyroscope, Compass, GPS, clock, etc.), as well as optionally other data from other sensors as desired. Such data can be collected at any interval such as greater than or equal to 1, 5, 10, 15, 20, 25, or 30 Hz (collections per second). Two types of data are collected—maneuver data and metadata. The maneuver data includes accelerometer, gyroscope, and compass data, and describes the specific movement of the device and/or the object associated with the device (e.g., the vehicle in which the device is located). Such data is typically 3-axis data that describes a maneuver—i.e., the speed, direction, change(s) in speed, and change(s) in direction that a vehicle takes during a maneuver. By the term "during a maneuver" is meant the time/position/speed from when a vehicle deviates from an expected path or vector until the time/position/speed that a vehicle returns to the expected path or vector. The second type of data is metadata, and includes information about the time and location of the maneuver. Thus, metadata includes location data (e.g., GPS coordinates or the like) and a time stamp. The timestamp can include a time when the maneuver begins as well as the time that the maneuver ends, or can be any suitable single time stamp (e.g., halfway between the beginning and ending times) provided that consistent methods are used for identifying the timestamp. Similarly the location can be a location where the maneuver begins as well as the maneuver that the maneuver ends, or can be any suitable single location (e.g., halfway between the beginning and ending locations) provided that consistent methods are used for identifying the location. In embodiments, identification of a maneuver indicates that at the location of the maneuver is a hazard, and such location can be referred to herein as a hazard location. The hazard location is added to the MTO database and can be refined if future sensor data in the same or very nearly the same location is observed.

In embodiments, test sensor data is data automatically collected by a plurality of devices configured to collect such data, each device on-board a test vehicle. In embodiments, the test vehicles traverse an array of interconnected paths—e.g., the road segments of a roadmap—collecting data at all times during the traversals. Maneuver data is picked and analysed from the stream of data as described herein. In embodiments the test vehicles traverse such paths in series—i.e., one vehicle following the next at regular intervals (e.g., 1, 2, 3, 4, 5, or more than 5 metres separation). This setup allows data to be gathered at regular time intervals (e.g., the time it takes a vehicle to traverse the interval distance) and allows determination of a temporary (and, presumably therefore, a moving) traffic obstacle. In embodiments the route of the test vehicles corresponds to paths in an interconnected array of paths such as a roadway data set. Such interconnected array of paths may be stored as a separate data set apart from the data collected by the systems/methods herein, although the systems may maintain a data set of such paths. The location(s) of any obstacles encountered and any maneuvers taken by the test vehicles is/are coordinated to a location along the paths of the interconnected array of paths. In embodiments the obstacle/maneuver location may be further correlated to a specific road segment ID. In this way is built a database of moving traffic obstacle locations that provides the specific geo-locations of MTOs, as encountered by the test vehicles and optionally further refined by user device data collected over time. Using GPS data, the MTO location may be correlated to the specific path upon which the vehicle was traversing when the MTO was encountered, or to a path adjacent to that path.

The test vehicles may traverse a specific path (e.g., a specific road segment) on a specific day and then repeat the traversal on a subsequent day or multiple days. By collecting data over a variety of days, the accuracy and reliability of the data can be improved, particularly regarding MTOs that appear in a specific location regularly or semi-regularly. Certain obstacles may be particularly common due to road conditions at a specific location—e.g., a hill may cause slow-moving trucks to be commonly observed obstacles.

A further piece of metadata that may be present for maneuver data is the type of vehicle used to obtain such data. This may be important where the type of vehicle influences the specific data—e.g., a school bus may maneuver differently from a saloon car, so tagging the maneuver data with the vehicle type allows the system to further refine the algorithm that picks out and recommends maneuvers.

Alternatively or in addition, test sensor data may be data collected manually in a "chase" vehicle—i.e., a vehicle following a test vehicle. The chase vehicle can have a human operator that manually identifies and records maneuver data taken by the test vehicle. The manually obtained data is treated as described for automated data collection, and the MTO database is built around the manually collected data. One chase vehicle may be used to follow a plurality of test vehicles, or the ratio may be one-to-one, as resources and/or context allows. The MTO database may comprise a combination of manually collected data and automatically collected data. The manually collected data may further include all of the metadata that would be present for automatically collected data (and in some embodiments, more metadata as the human operator may be able to recognize information that would not be available to an automated system of data collection), including timestamps, location data, MTO characteristics, etc.

In addition to allowing general collection for maneuvers over a plurality of paths, a chase vehicle also assists in calibration of automated data collection. For example, while a user device may be on board a test vehicle and recording data as described herein, a chase vehicle can be behind the test vehicle manually recording maneuver labels (e.g., "right swerve" or "hard braking") at various times as such maneuvers are observed. The maneuver labels can then be correlated via timestamps to the sensor data from the user device, thereby allowing calibration so that future maneuvers can be identified in the sensor data. In the absence of a chase vehicle and manual time stamped labels identifying maneuvers, maneuvers can be identified in automatically obtained sensor data by manually or automatically evaluating the data and picking out abnormal sensor readings that may be indicative of a maneuver (e.g., a dip in the z-axis that indicates hard braking or the like). Using any of these methods or another suitable method, a database of MTOs is built from the test sensor data. Test sensor data that is labelled as a specific maneuver (whether the label is from a manual labelling or an automatic analysis of data) is referred to herein as labelled data. Examples of maneuvers that may be identified and labelled include right and left turns, right and left swerves, braking, and combinations thereof.

In embodiments, in order to identify maneuvers (and, where desired and appropriate, other maneuvers), and build a maneuver model, three types of data are used: accelerometer, gyroscope, and speed data, as well as the time duration of a maneuver. For each observation, the maximum, minimum, mean, standard deviation of each sensor parameter are calculated and combined with time duration as a feature. A decision tree (e.g., using rule such as time duration, mean of x-axis gyroscope, maximum of y-axis gyroscope, and maximum of z-axis accelerometer, and the like) can be used to classify and validate the maneuver data.

Recognizing a maneuver from the data set of a single test vehicle may not be sufficient to capture a MTO, since a maneuver by a single vehicle may be the result of obstacles that are not MTOs (e.g., speed bumps, etc.). Thus, the procedures for recognizing a maneuver are repeated for the data sets from each of the test vehicles. Test sensor data from multiple test vehicles can be grouped or clustered, e.g. according to correlations in the time and location metadata. For example, if the first three vehicles in a convoy of five vehicles swerve to the right at the same location and very close in time, but the last two vehicles do not swerve, the database should record that a MTO occurred at the location with a specific time duration. This type of grouping can also be used to predict the maneuvers that are caused by MTOs and predict the specific behaviour of vehicles. Verification of the data can be via post-data-collection interviews of the vehicle drivers, or via labelling of the maneuver from a chase vehicle, or via cognitive methods for recognizing patterns, or other methods as appropriate.

As explained in the Examples provided herein, MTOs can be identified from test sensor data. For example, a maneuver matrix comprises the resulting numerical representations of vehicle maneuvers, as identified in test vehicle data that has been analysed or otherwise labelled. The maneuver matrix can then be analysed to identify vehicle actions that are statistically less common—e.g., less common actions at a specific road position over a plurality of vehicles (and thus a plurality of times) indicates that an obstacle was present for one or a few vehicles but not most or all other vehicles. This strongly indicates the presence of an MTO. A second matrix (also referred to herein as a MTO matrix) can then be constructed from the maneuver matrix, showing the location of all MTOs based on the abnormal vehicle actions. Furthermore, the MTOs in the matrix can be analysed based on clustering—MTOs that are adjacent may be indicative that several vehicles encountered the same MTO. Various methods for analysing clusters of data are known and can be employed to determine various information from the data.

In addition to containing locations of MTOs, the MTO database may also contain a characteristic of each MTO. Examples of an MTO characteristic may be any of the following in any combination, or other as suitable: whether the MTO is long-lived (e.g., affects vehicles for a long period of time such as 20, 25, 30, 45, 60, or more than 60 seconds) or short lived (e.g., affecting vehicles for a short period of time such as less than 20, 15, 10, or 5 seconds); whether the MTO is isolated to a single geo-location (e.g., a single location where pedestrians tend to cross the road) or tends to move a distance as it disrupts traffic (e.g., locations where domesticated animals tend to walk for some distance along a roadway); whether the MTO is caused by an inanimate object such as a burst water pipe, an animal(s) such as herding domesticated animals, or a human(s) such as children at play or pedestrians; the time distribution of common occurrence of the MTO (e.g., the MTO tends to occur mostly at dawn and dusk, or mostly during school hours, etc.)

In addition to outputting the preferred route, as mentioned herein, further output of the systems and methods described herein can take various forms. For example, based on the identification of potential MTOs and the creation of the MTO database, the system can identify locations along roads that tend to have significant MTOs. By "significant" is meant that the MTOs at that road segment are frequent (e.g., an MTO is present at the same location frequently, such as for greater than or equal to 5, 10, 15, 20, 25, 30, 35, 40, 45, or 50% of the vehicles that pass that location) and/or severe (e.g., an MTO at a specific location tends to persist for an extended period of time, or tends to disrupt traffic for a significant number of vehicles passing the location, either over time or over space).

Mapping significant MTOs is helpful for a variety of reasons. For example, the map can be a resource that is provided to route recommendation systems (e.g., on-board GPS mapping systems for vehicles). In embodiments, a route recommendation system receives data pertaining to MTOs from the systems herein, and alters route recommendations based on the presence (or lack) of potential MTOs along potential routes. For example, a route recommendation system can calculate two potential routes between a given starting location and a given destination location, analyse the MTOs along each route, and use that analysis as a factor in determining the route recommendation (along with other factors such as traffic patterns, route distance, etc.). The route recommendation system can be on-board a vehicle, in which case the MTO mapping may be either downloaded and thus local, or the route recommendation system can access the MTO mapping on a remote server for any route calculations. Where the mapping is stored locally, automatic updates (and/or manual updates) can be scheduled to ensure that the system has the most up-to-date and accurate MTO information. The route recommendation system can be configured to output (e.g., display or verbalize) possible routes and to indicate in the output the MTOs that are expected along the possible routes. For example, a user interface of the route recommendation system on board a vehicle can be modified based on the MTO data, indicating recommended routes, the MTOs along such routes (as well as non-recommended routes and the MTOs along such routes), and recommended maneuver instructions for specific potential MTOs. In embodiments, a route recommendation system (or a suitable equivalent) can be instructed based on mapped MTO data to provide driver alerts. Such alerts can be visual (e.g., alerts on a screen on the dashboard of a vehicle, or alerts on a mobile device, either of which involves altering a user interface to display the alert) or audible (e.g., automated voice alerts delivered via a vehicle audio system or the speaker of a mobile device).

As mentioned, another output is specific for an autonomous vehicle (i.e., a driverless vehicle fitted with an autonomous control system), and comprises machine-readable instructions suitable for instructing an autonomous control system. Such instructions typically include route information, e.g., in the form of a sequence of GPS coordinates and instructions for turning, braking, etc., as well as specific maneuver instructions for specific MTOs. The instructions can be selected based (at least in part) on the MTOs determined along a variety of possible routes. The possible routes are those routes that are analysed by an autonomous control system, e.g., in the process of determining a route between starting and destination locations. The instructions can be automatically determined and can involve the MTOs as a weighted factor in the determination. In addition, the MTO mappings can result in output that comprises maneuver instructions, such as instructions that cause an autonomous control system to alter its behaviour—e.g., slow the vehicle in an area that has a significant MTO, or move the vehicle to another lane in a road that tends to have significant MTOs, or turn the vehicle, or take some other maneuver action.

Another output of the systems and methods herein is specific to Intelligent Vehicle Systems (IVS)—i.e., semi-autonomous vehicles or driver aids. In embodiments, instructions provided to the IVS cause the IVS to automatically take extra precautions by executing a maneuver (e.g., slow the vehicle or change lanes, etc.) in areas that have significant MTOs. Such instruction can be based on data from the PTMO mapping, and can be provided in real time as the vehicle traverses road segments or can be provided ahead of time (e.g., when a vehicle begins traversing a route between starting and destination locations).

Where the output includes maneuver instructions, such instructions may include, for example, a steering component and a speed component such that the combination enables the driver (or the autonomous control system, or IVS, etc.) to avoid the MTO. For example, the steering component can provide instructions for the extent of steering (e.g., vectors of travel) needed to avoid. The speed component may involve breaking or accelerating, depending on the specific situation.

A further output includes redefining a predetermined route based on predictions of MTOs. For example, the methods/systems can determining a velocity of the object (based on sensor data from the user device or other devices) and predicting a future location of the object based on the velocity and location of the object. When the future location of the object is in proximity to a moving traffic obstacle location, the method can include calculating an alternative route that avoids the future location. The alternative route is then communicated to the device and an action is taken (e.g., an alert comprising the moving traffic obstacle location and the alternative route are presented to the driver via an altered user interface, or an autonomous driver system is altered to take the alternative route, etc.).

A further output includes real-time determination of MTOs that are along a predicted route of the vehicle, and real-time modification of the route due to the MTOs. In such embodiments a signal may be received by the user device via, for example, a sensor, an RF receiver, radar, a satellite link, or the like. Such signal can be received, for example, from a real-time service that is monitoring road conditions and providing the signal on request from a server. The systems herein would thus include any necessary hardware for receiving such signals (e.g., RF or satellite antenna, receiver circuitry, etc.).

In general, user-level output is the output suitable for determining or changing the route of a vehicle (e.g., changing a recommended route based on information stored or obtained by a system/method as described herein). Such change may be effected by automated implementation (e.g., by an autonomous control system, etc.) of instructions that are output by the systems herein, or by manual implementation (e.g., by a human driver, etc.) of those instructions. Communication of the instructions involves alterations of hardware—e.g., a graphical user interface providing a new map with a recommended route overlay on the map, or line-by-line written instructions, or step-by-step verbalized instructions via a voice synthesizer, or the like.

The output may further be used to refine maps and traffic simulators with MTO information. For example, maps can be updated with accurate speed given roads with MTOs. Roadways with significant MTOs that require a lot of maneuvering to avoid MTOs can be flagged in digital or analog maps. The information can further be provided to road maintenance and road management authorities in order to improve the quality of maintenance/management. Route suggestion software can be updated to consider high frequency MTOs such a school bus stops, children crossing, etc.

In embodiments, the systems and methods described herein are configured such that the user device can be temporarily or entirely offline and still provide some level of MTO information. Thus, for example, a locally stored MTO database can be obtained or constructed, and used by the user device along with sensor-based location information to alert the driver or autonomous control system or other device of MTOs along a potential route, in the vicinity of the device, or in an anticipated location. The locally stored database can be updated as mentioned herein if the user device is connected to a network and thus in communication with a server storing a more up to date version of the MTO database (being up to date and more comprehensive, as the server may be in communication with other users).

Selected aspects of the methods/systems herein are provided in the figures. With reference to FIG. 1, test vehicle 100 contains a device that is able to record sensor data 110. Sensor data 110 is used by the system (e.g., maneuver classifier module 120) in order to generate maneuver matrix 130, as described in more detail herein. The maneuver matrix 130 is analyzed by the system, and in the analysis the system recognizes MTO 140. The MTO is part of an MTO database (not shown) but may be the basis of output 150, particularly where another vehicle passes the location of the MTO (or generates a route containing the location of the MTO).

Figure 2:
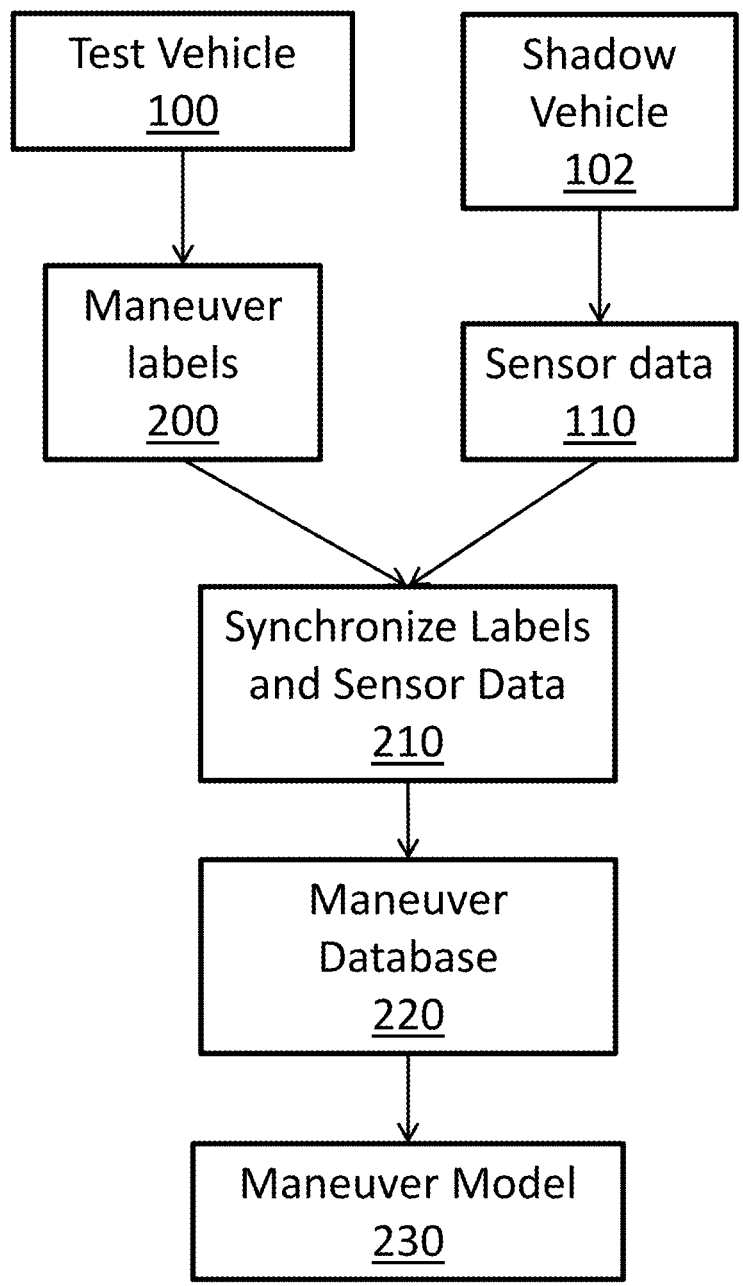
FIG. 2 provides a flow diagram showing the acquisition and processing of data according to an embodiment of the invention.

With reference to FIG. 2, test vehicle 100 and shadow vehicle 102 generate maneuver labels 200 and sensor data 110, respectively. (The opposite can also be employed—the test vehicle can provide sensor data and the shadow vehicle can provide maneuver labels.) These data are aggregated and synchronized 210 by an appropriate system module, and the resulting maneuver database 220 is used to build maneuver model 230.

Figure 3:
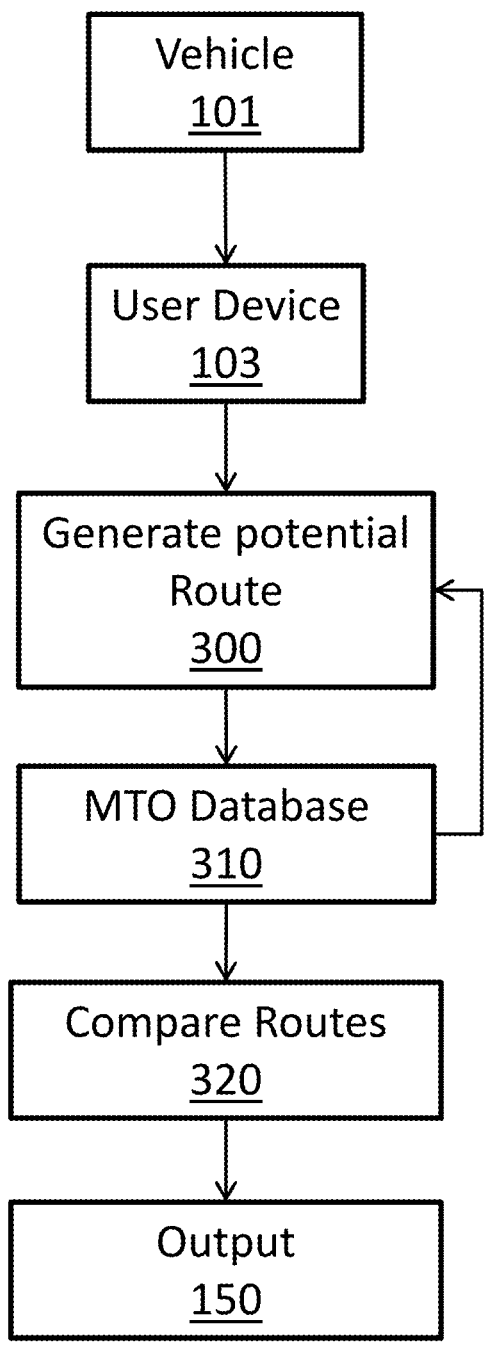
FIG. 3 provides a flow diagram showing the process of generating a preferred route based on moving traffic obstacles according to an embodiment of the invention.

With reference to FIG. 3, vehicle 101 contains user device 103, which device generates a potential route 300. The potential route (or the locations and road segments that form the potential route) is cross-referenced with MTO database 310 in order to determine the number, severity, etc. of the MTOs along the potential route. This process of cross-referencing is repeated for as many potential routes as are desired, and the results are compared 320 in order to determine a preferred route. The preferred route forms the output 150 that is communicated to user device 103. Alternatively, the cross-referencing and comparisons are done by user device 103 in which case no communication to user device 103 is necessary. In either case, user device 103 obtains the preferred route and the vehicle 101 follows the preferred route. Certain algorithms of the modules mentioned above are provided in the examples, although it will be understood that such are merely exemplary and are not meant to be limiting.

Figure 8:
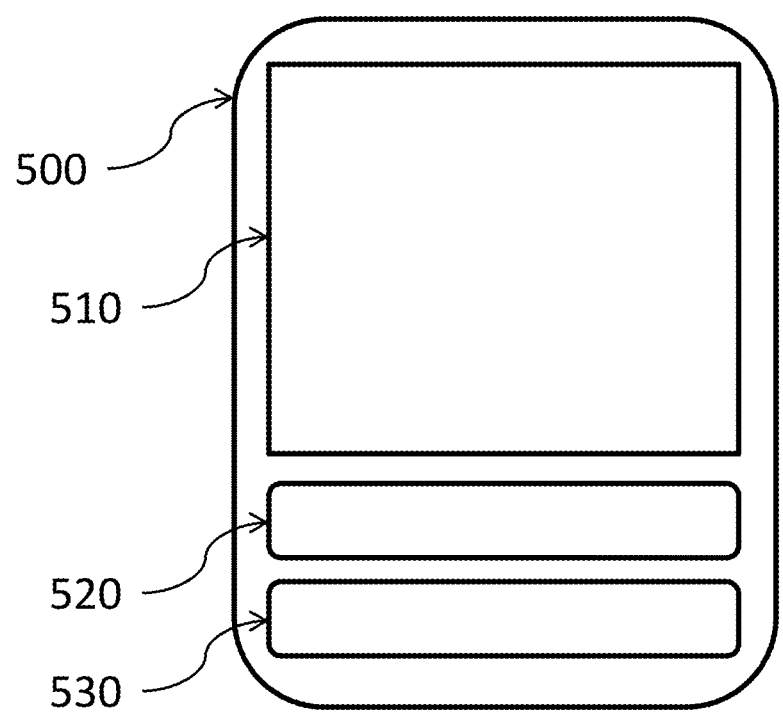
FIG. 8 provides a graphical user interface showing a modification to a route recommendation based on information obtained from a system according to an embodiment of the invention.

With reference to FIG. 8, a representation of a graphical user interface (GUI) 500 is provided. The GUI could be, for example and as mentioned herein, displayed on a mobile device such as a smartphone, or displayed on a fixed device such as a navigation device mounted in a vehicle. The GUI as shown provides map region 510, which displays a street-level map (or any desirable and suitable map) of the location of interest, such as the location of the device, a potential destination location, etc. In the specific example shown, the GUI can include an alert box 520 and a re-routing box 530. Alert box 520 provides information to the user of a situation such as an MTO, while re-routing box 530 provides information in the form of routing directions (e.g., turning, street names, etc.) consistent with the re-routing. The same GUI can be used for normal operations, such as by deleting alert box 520 or repurposing alert box 520 to provide other information.

The methods of the invention therefore include, as output, modifying the GUI of a user device (either fixed or mobile) in response to determined MTO and related information/determinations. The modifications can include displaying calculated re-routing information, MTO information (location, movement, etc.) or other information as described herein.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based. Unless otherwise specified or clear from the context, a server is connected to and accessible via a network, such as the Internet or (in rare instances) a private network. For example, the server is connected to the Internet and accessible by user devices.

Certain standardized and/or everyday components of the systems described herein are not mentioned or are briefly mentioned. Such components, which includes I/O modules, compilers, communication modules, and the like, are not necessary to be described herein in order for one of ordinary skill in the art to make and practice the disclosed invention. These components are omitted or briefly mentioned merely for the sake of brevity.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

Example 1

Data labelling, maneuver classification, and MTO detection algorithms were prepared and tested. The algorithms are shown below.

---

Algorithm 1: Data Labelling.

---

Input: labels file and sensor data
Output: a collection of several files that stores observations of each category
1   # For maneuver 1, 2, 5 and 6, get [starting, ending] time stamps
2   for $i_1 \leftarrow$ [1, 2, 5, 6] do
3   L   $TS[i_1] \leftarrow$ getStartEndTS(labels_file, $i_1$)
4   # For maneuver 3 and 4, get [starting, ending] time stamps
5   $TS_{extension} \leftarrow$ averageTime(TS[1,2,5,6])
6   for $i_2 \leftarrow$ [3, 4] do
7   |   $TS_{middle}[i_2] \leftarrow$ getMiddleTS(labels_file, $i_2$)
8   L   $TS[i_2] \leftarrow [TS_{middle}[i_2][0] + TS_{extension}/2, TS_{middle}[i_2][1] + TS_{extension}/2]$
9   # Synchronize the labels with sensor data
10  for $i_3 \leftarrow$ 1 to 6 do
11  |   for [ts1,ts2] $\leftarrow TS[i_3]$ do
12  |   |   csv $\leftarrow$ getData(sensor_data, ts1, ts2)
13  |   |   # Put csv to the file under its category
14  |   |   file $\leftarrow$ label_name
15  L   L   file $\leftarrow$ csv
16  return all_files

---

Algorithm 2: Maneuver Classifier.

---

Input: a collection of several files that stores observations of each category
Output: maneuver classifier
1   for i $\leftarrow$ 1 to len(all_files) do
2   |   csvs $\leftarrow$ getAllcsvs(all_files[i])
3   |   label $\leftarrow$ file_name
4   |   for j $\leftarrow$ 1 to len(all_files) do
5   |   |   csv $\leftarrow$ csvs[j]
6   |   |   # Select accelerometer, gyroscope, speed, and time stamps of a maneuver as
    |   |   attributes
7   |   |   csv_selected $\leftarrow$ getAttributes(csv)
8   |   |   # Calculate the maximum, minimum, mean, standard deviation of each sensor data
    |   |   and combine time duration as features
9   |   |   csv_caculated $\leftarrow$ getFeatures(csv_selected)
10  |   |   # Get the label
11  |   |   csv_caculated[label] $\leftarrow$ label
12  L   L   training[i] $\leftarrow$ csv_caculated
13  manuever_classifier $\leftarrow$ buildDecisionTree(training)
14  return manuever_classifier

| Algorithm 3: Moving Traffic Obstacle Detection. |
|---|

```
Input: a collection of csv files that stores sensor data, and maneuver classifier
Output: MTOs matrix
1  # Process the sensor data
2  testing ← processData(csv_files)
3  n_vehicles ← len(csv_files)
4  # Predict maneuvers
5  for i₁ ← 1 to n_vehicles do
6  L    manuevers[i₁] ← predictManuevers(testing[i₁], classifier)
7  # Get PMTO matrix
8  n_windows ← len(manuevers[0])
9  for i₂ ← 1 to n_windows do
10 L    PMTO_matrix[i₂] ← getPMTOs(manuevers[:][i₂])
11 # Clustering PMTOs
12 PMTO_points ← getPoints(PMTO_matrix)
13 n_clusterings ← sum(PMTO_points) / n_vehicles
14 clusterings ← KMeans(PMTO_points, n_clusterings)
15 # Dectect MTOs
16 MTO_matrix ← getMTOs(clusterings)
17 return MTO_matrix
```

Example 2

In an example, a garbage truck was physically followed (within range for visual contact) by a chaser vehicle. The garbage truck was equipped with a smartphone to receive sensor data. The chaser vehicle included a smartphone with a mobile app, the app being capable of recording time stamps to label the maneuvers. Each of six possible maneuvers was assigned a number: 1=left turn; 2=right turn; 3=left swerve; 4=right swerve; 5=braking; 6=other maneuver. Maneuvers 1, 2, 5 and 6 were labeled at the start and the end of each maneuver. Maneuvers 3 and 4 were labeled in the middle time, which is approximately at the middle of maneuver, as it cannot be known in advanced when the vehicle is going to take these types of maneuver. The data labels required synchronization. Thus, for maneuver 1, 2, 5 and 6, time stamps were extracted for starting and ending at labels for one maneuver. For maneuver 3 and 4, middle time stamps were extracted for labels.

Thus, the following were set:

starting time=$TS(middle)-TS(extension)/2$ ending time=$TS(middle)+TS(extension)/2$ wherein TS(extension)=average time duration for the observations from maneuver 1, 2, 5 and 6. Starting and ending time were then matched with sensor data, and these data were extracted as one observation.

Maneuver classification followed the observations, and proceeded as described herein.

Example 3

In an example, smartphones equipped with data collection software were mounted on nine (9) garbage trucks from Kaloheni Depot in Nairobi, Kenya to collect data during daily operation. Data processing was carried out as described herein. In summary, a matrix of maneuvers is created from the several vehicles following each other. The maneuvers that are potentially caused by moving traffic obstacles are predicted by comparing maneuvers in the matrix. Potential moving traffic obstacles are clustered according to the maneuver data. Moving traffic obstacles are then detected from the clusters.

With reference to FIGS. 4-7, the above summary and the concept of clustering can be illustrated. In FIG. 4, a maneuver matrix is provided showing data from nine separate vehicles (numbered 1-9 along the x-axis) that each traverse 7 different positions on a roadway (numbered 1-7 along the y-axis). Each number in the matrix represents an action by a vehicle, as follows (same as in Example 2): "1" represents a left turn; "2" represents a right turn; "3" represents a left swerve; "4" represents a right swerve; and "5" represents braking. Furthermore, "6" represents other movement such as normal vehicle movement (e.g., straight movement without any change in speed). These values are based on sensor data and are assigned from the sensor data after calibration of the sensor data (e.g., such that the algorithm can recognize a right swerve from accelerometer and/or gyroscope data) and/or after labelling of the data.

Figure 5:
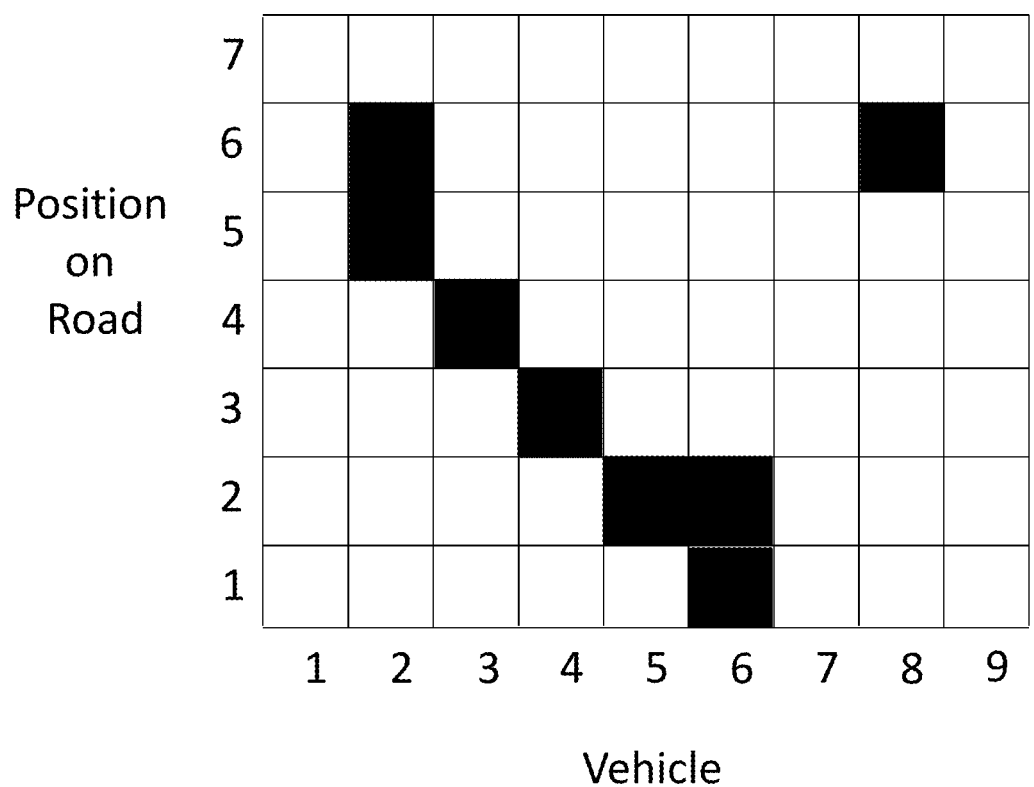
FIG. 5 provides a chart showing sample data for manoeuvres over a section of road for several vehicles according to an embodiment of the invention.

From the data in FIG. 4, the matrix of FIG. 5 can be prepared. This matrix shows black squares at any road position and for any vehicle where there is a "standout" value from the data in FIG. 4—e.g., a vehicle action that is different from a threshold percentage of other vehicle actions. Put another way, a maneuver window is predicted as a potential moving obstacle if its percentage on the total number of maneuvers at a location is below a certain percentage. This percentage is defined as the threshold that can distinguish potential moving traffic obstacles (MTOs). In this example, it was assumed that MTO=30%, and MTO prediction followed. The threshold can be adjusted as desired in order to pick out unusual activity (presumably resulting from MTOs) by vehicles.

For example, from FIG. 4, at position 2, the maneuver matrix has the values (1,1,1,1,2,5,1,1,1). The percentage of 2 and 5 are both 11.1%, which is below the threshold value of 30%. Thus it is predicted that the maneuvers that occurred for the fifth and sixth vehicles at position 2 are due to an MTO. Similarly, maneuvers due to likely MTOs are identified at the other positions on the road. This results in the black squares on the matrix shown in FIG. 5. It will be noticed that, for example, in road position 6, maneuver 4 is due to an MTO (as shown by the black square in the matrix of FIG. 5 at road position 6, vehicle #2) but maneuver 2 is not considered due to an MTO (as indicated by the lack of black squares in FIG. 5 at road position 6, vehicles 1, 3, and 4).

Figure 6:
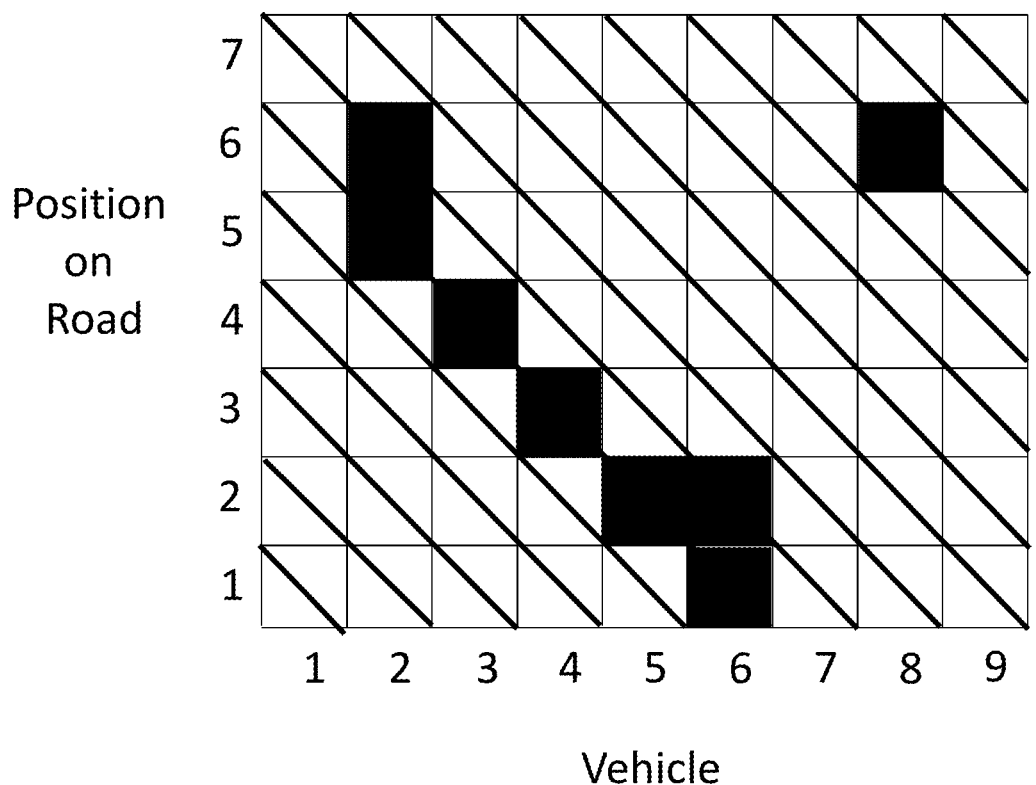
FIG. 6 provides a chart showing sample data for manoeuvres over a section of road for several vehicles, and lines connecting vehicle manoeuvres at constant time, according to an embodiment of the invention.

The determined maneuvers create a pattern in the matrix in FIG. 5, which pattern can be further analyzed. FIG. 6, then, shows diagonal lines that are intersect squares at a constant timestamp. FIG. 5 provides diagonal lines that indicate constant time stamps, as the distance difference between vehicles is 4 meters, which is one matrix square distance. The orientation of these lines depends on the spacing of the vehicles and the spacing of the road positions.

Figure 7:
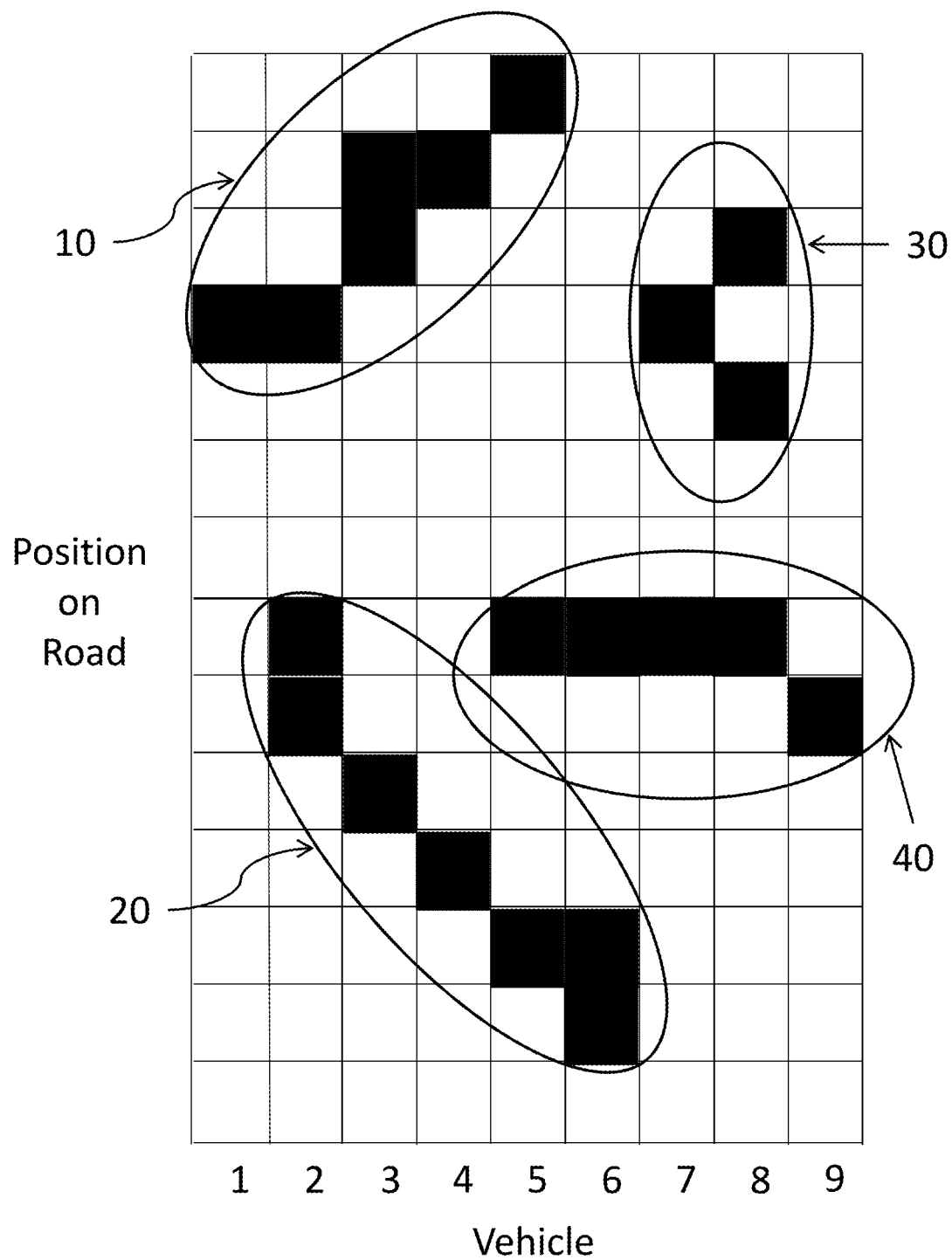
FIG. 7 provides a chart showing sample data for manoeuvres over a section of road for several vehicles, and various clustered manoeuvres, according to an embodiment of the invention.

Furthermore, clustering of the maneuvers considered due to MTOs is shown in FIG. 7 in an expanded matrix with more road positions. Ovals indicate clustering. The orientation and size of the ovals can provide information on the type and characteristics of the MTO. For example, cluster 10 represents an MTO that is moving further along the road (towards higher road position numbers), whereas cluster 20 represents an MTO that is moving closer to the beginning of the road (towards lower road position numbers). Cluster 30 was encountered by two vehicles only, and was moving along the road when it was encountered. Cluster 40 was encountered by a large number of vehicles in the same or nearly the same position—i.e., once the MTO appeared, it remained an obstacle and did not move for a relatively long period of time.

Example 4

A mobile application built on the Android platform was designed to collect sensor data from smartphones was installed on smartphones placed in test vehicles. Three-axis data was collected and time-stamped from the accelerometer, gyroscope, gravity, orientation, linear acceleration, GPS, and magnetic field sensors at a frequency of 20 Hz. Sensor data was uploaded to a central NoSQL database for storage.

Similar data collection was repeated the next day, thereby allowing identification of certain stationary objects on the roadway (e.g., parked car that leaves or does not leave the next day). Slow moving vehicles and their locations were also identified in the data.

Example 5

The same nine garbage trucks from the previous example were tracked (i.e., data was collected from the smartphone sensors) as they traversed two different roads in Nairobi. The vehicles followed one another about 4 metres apart.

The data from each vehicle was processed as follows. A data window was selected, the data window being 4 metres in length. This distance was selected as this is the average distance required for a car maneuver. This data window allows building of the maneuver classifier. Each data window overlaps an adjacent data window by 2 meters to reduce missing maneuvers. Windows are shifted according to the movement of the vehicles, as indicated by the data.

When there is low GPS accuracy, data was interpolated by assuming a uniform distance between the points where GPS failed and then recovered. The feature processing for sample and training data are then the same.

A matrix of maneuvers was produced from the vehicle data according to the methods described herein. From the matrix, comparisons of maneuvers allowed the identification of potential MTOs. Potential MTOs were clustered and MTOs were detected from the clustered events. A matrix of maneuvers was built for each of the two roads based on the nine sequence of maneuver data from the nine vehicles following one another.

What is claimed is:

1. A method for controlling a route of an object, the method comprising:
predicting a location of one or more moving traffic obstacles for entry in a moving traffic obstacle database by identifying one or more maneuvers performed by one or more additional traffic objects, the one or more maneuvers being indicative of an existence of the moving traffic obstacle;
receiving a starting location and a destination location from a device onboard the object;
determining a first potential route between the starting and destination locations, the first potential route comprising a first set of segments of a first road, each segment of the first road comprising one or more lanes;
determining at least one future location for each of one or more of the moving traffic obstacles traveling along the first potential route from the moving traffic obstacle database, the moving traffic obstacle database comprising an interconnected array of paths, wherein each moving traffic obstacle along the first potential route comprises a traffic object moving along earth's surface such that the future location for each moving traffic obstacle along the first potential route is different than a current location of the corresponding moving traffic obstacle along the first potential route;
determining a second potential route between the starting and destination locations, the second potential route comprising a second set of segments of a second road, each segment of the second road comprising one or more lanes, the second set of segments of the second road and the first set of segments of the first road being non-equal;
determining at least one future location for each of one or more of the moving traffic obstacles traveling along the second potential route from the moving traffic obstacle database, wherein each moving traffic obstacle along the second potential route comprises a traffic object moving along earth's surface such that the future location for each moving traffic obstacle along the second potential route is different than a current location of the corresponding moving traffic obstacle along the second potential route;
identifying a preferred route from the first and second routes, the preferred route having a minimum amount of the moving traffic obstacles; and
communicating instructions to the device to follow the preferred route, wherein the object subsequently follows the preferred route.

2. The method of claim 1, wherein the moving traffic obstacle database comprises the interconnected array of paths, and the method further comprises:
collecting test sensor data for a plurality of test objects traversing a first path;
determining, from the test sensor data, a presence of one of the moving traffic obstacles at a hazard location along the first path, and determining a characteristic of the one of the moving traffic obstacles;
adding the hazard location to the moving traffic obstacle database.

3. The method of claim 1, wherein the characteristic of the moving traffic obstacle is whether the moving traffic obstacle is stationary or mobile.

4. The method of claim 1, wherein the object is an autonomous or semi-autonomous vehicle, and wherein the instructions comprise machine readable instructions configured to cause the object to automatically follow the preferred route.

5. The method of claim 1, wherein the object is a vehicle and wherein the device comprises a display, and wherein the instructions cause the preferred route to be displayed on the display.

6. The method of claim 1, wherein the minimum amount of moving traffic obstacles is a minimum number of moving traffic obstacles or a minimum severity of a traffic effect caused by one or more of the moving traffic obstacles, or a combination thereof.

7. The method of claim 1, wherein the first and second potential routes each comprise a plurality of connecting paths, and wherein at least one of the connecting paths from the first potential route differs from at least one of the connecting paths from the second potential route.

8. The method of claim 1, wherein the moving traffic obstacle database comprises the interconnected array of paths, and wherein the method further comprises:
- collecting test sensor data for a plurality of test objects serially traversing a test path, wherein the test path is selected from the array of paths, and wherein the test sensor data further comprises time stamp metadata;
- identifying in the test sensor data maneuver actions and their associated time stamps at predefined locations along the test path;
- grouping the identified maneuver actions from the test sensor data according to their time and locations;
- identifying one or more of the moving traffic obstacles from the grouped maneuver action data.

9. A method for controlling a maneuver by an object, the method comprising:
- predicting a location of one or more moving traffic obstacles for entry in a moving traffic obstacle database by identifying one or more maneuvers performed by one or more additional traffic objects, the one or more maneuvers being indicative of an existence of the moving traffic obstacle;
- determining a future location of the object and correlating the future location of the object to a path in the moving traffic obstacle database, the moving traffic obstacle database comprising an array of interconnected paths and an identity of one or more of the moving traffic obstacles, each moving traffic obstacle having an associated moving traffic obstacle location along the interconnected paths, wherein each moving traffic obstacle comprises a traffic object moving traveling along earth's surface such that a future location for each moving traffic obstacle is different than a current location of the corresponding moving traffic obstacle;
- determining, from the moving traffic obstacle database, a relevant moving traffic obstacle at a relevant future moving traffic obstacle location in close proximity to the future location of the object on a first potential route, the first potential route comprising a first set of segments of a first road, each segment of the first road comprising one or more lanes;
- determining maneuver instructions based on the relevant moving traffic obstacle, the relevant future moving traffic obstacle location, the object, and the future object location, the maneuver instructions identifying a second potential route, the second potential route comprising a second set of segments of a second road, each segment of the second road comprising one or more lanes, the second set of segments of the second road and the first set of segments of the first road being non-equal;
- communicating the maneuver instructions to a device associated with the object, wherein the communicating causes the device to automatically execute or display the maneuver instructions.

10. The method of claim 9, wherein the future moving traffic obstacle location is correlated to the path of the object or to a path adjacent to the path of the object.

11. The method of claim 9, wherein the device is a standalone GPS system with a display, and wherein the maneuver instructions are configured to automatically appear on the display.

12. The method of claim 9, wherein the device is a control module for an autonomous or semi-autonomous vehicle, and wherein the maneuver instructions are configured to control to movement of the vehicle.

13. The method of claim 9, wherein the maneuver instructions comprise a steering component and a speed component, and wherein the maneuver instructions instruct a driver or a control module to avoid the future moving traffic obstacle location.

14. The method of claim 9, wherein the moving traffic obstacles in the moving traffic obstacle database are selected from moving vehicles, animals, pedestrians, non-motorized vehicles, and unspecified obstacles, and wherein the moving traffic obstacle locations in the moving traffic obstacle database are based on test sensor data obtained from test objects traversing the interconnected paths.

15. The method of claim 9, further comprising:
- collecting test sensor data for a plurality of test objects serially traversing a test path, wherein the test path is selected from the array of paths, and wherein the test sensor data further comprises time stamp metadata;
- identifying in the test sensor data maneuver actions and their associated time stamps at predefined locations along the test path;
- grouping the identified maneuver actions from the test sensor data according to their time and locations;
- identifying one or more of the moving traffic obstacles from the grouped maneuver action data.

16. The method of claim 15, wherein the grouping of identified maneuver actions is based on time and location metadata pertaining to the test sensor data.

17. The method of claim 9, wherein the array of interconnected paths are roadways and wherein the method further comprises communicating the moving traffic obstacle locations to a roadway maintenance system.

18. The method of claim 9, further comprising determining a velocity of the object and predicting the future location of the object based on the velocity and location of the object, and when the future location of the object is in proximity to the future moving traffic obstacle location, calculating an alternative route that avoids the future location and communicating to the device an alert comprising the future moving traffic obstacle location and the alternative route.

* * * * *